(12) United States Patent
Krebs et al.

(10) Patent No.: US 6,465,104 B1
(45) Date of Patent: Oct. 15, 2002

(54) MODIFIED POLYURETHANE HOTMELT ADHESIVE

(75) Inventors: Michael Krebs, Hilden (DE); Yingjie Li, Batavia, IL (US); Ingolf Scheffler, Neuss (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/694,172

(22) Filed: Oct. 23, 2000

Related U.S. Application Data

(63) Continuation-in-part of application No. 09/185,966, filed on Nov. 5, 1998, now abandoned.
(60) Provisional application No. 60/067,197, filed on Dec. 1, 1997, now abandoned.

(51) Int. Cl.$^7$ ............................................. C09J 175/04
(52) U.S. Cl. .................... 428/423.1; 525/127; 525/130; 525/131; 525/455; 156/331.4
(58) Field of Search ................. 525/127, 130, 525/131, 455; 156/331.4; 428/423.1

(56) References Cited

U.S. PATENT DOCUMENTS

| | | | |
|---|---|---|---|
| 4,352,858 A | 10/1982 | Stanley | 428/432.1 |
| 4,537,934 A | 8/1985 | Fock et al. | 525/123 |
| 4,585,819 A | 4/1986 | Reischle et al. | 524/196 |
| 4,775,719 A | 10/1988 | Markevka et al. | 525/125 |
| 4,808,255 A | 2/1989 | Markevka et al. | 156/307 |
| 4,999,407 A | 3/1991 | Gilch et al. | 525/457 |
| 5,018,337 A | 5/1991 | Carter et al. | 53/458 |
| 5,019,638 A | 5/1991 | Mueller et al. | 528/83 |
| 5,021,507 A | 6/1991 | Stanley et al. | 525/127 |
| 5,155,180 A | 10/1992 | Takada et al. | 525/440 |
| 5,166,300 A | 11/1992 | Rumon et al. | 528/65 |
| 5,166,302 A | 11/1992 | Werner et al. | 528/67 |
| 5,173,538 A * | 12/1992 | Gilch | 525/130 |
| 5,324,778 A | 6/1994 | Boutillier et al. | 525/56 |
| 5,506,296 A | 4/1996 | Chenard et al. | 525/56 |
| 5,550,191 A | 8/1996 | Hung et al. | 525/92 |
| 5,824,743 A | 10/1998 | Krawczyk et al. | 525/127 |
| 5,852,080 A | 12/1998 | Philbin et al. | 524/51 |
| 5,866,656 A | 2/1999 | Hung et al. | 525/123 |
| 5,922,805 A | 7/1999 | Bouttefort et al. | |

FOREIGN PATENT DOCUMENTS

| | | |
|---|---|---|
| DE | 3236313 | 4/1984 |
| DE | 3933204 | 4/1991 |
| EP | 248658 | 12/1987 |
| EP | 340906 | 11/1989 |
| EP | 354527 | 2/1990 |
| EP | 369607 | 5/1990 |
| EP | 472278 | 2/1992 |
| EP | 511566 | 11/1992 |
| EP | 0455400 | 2/1995 |
| EP | 0819711 | 1/1998 |
| GB | 2234516 | 2/1991 |
| WO | WO 9114727 | 10/1991 |

* cited by examiner

Primary Examiner—Patricia A. Short
(74) Attorney, Agent, or Firm—Stephen D. Harper

(57) ABSTRACT

Hotmelt polyurethane adhesive compositions which are solid at room temperature and capable of being cured by moisture are obtained by combining the reaction product of a polyisocyanate and a low molecular weight polymer derived from ethylenically unsaturated monomers and containing active hydrogen groups such as hydroxyl with an isocyanate-containing polyurethane prepolymer derived from one or more polyols. The low molecular weight polymer component may, for example, be obtained by free radical polymerization of mixtures of unsaturated monocarboxylic acids, alkyl esters of unsaturated monocarboxylic acids, and/or hydroxyalkyl esters of unsaturated monocarboxylic acids.

66 Claims, No Drawings

MODIFIED POLYURETHANE HOTMELT ADHESIVE

CROSS-REFERENCE TO RELATED APPLICATIONS

This application is a continuation-in-part of Ser. No. 09/185,966 filed Nov. 5, 1998, now abandoned, which claims priority from U.S. provisional application Serial No. 60/067,197, filed Dec. 1, 1997, now abandoned, the disclosure of which is incorporated herein by reference.

FIELD OF THE INVENTION

This application relates to a quick-setting, moisture-curing polyurethane hotmelt adhesive, to its production and to its use.

BACKGROUND OF THE INVENTION

Moisture-curing or moisture-crosslinking polyurethane hotmelt adhesives are adhesives which are solid at room temperature and which are applied in the form of a melt, their polymeric constituents containing urethane groups and reactive isocyanate groups. Cooling of the melt results initially in rapid physical setting of the adhesive followed by a chemical reaction of the isocyanate groups still present with moisture to form a cross-linked, infusible adhesive. It is only after this chemical curing with moisture, accompanied by an increase in the size of the molecules and/or crosslinking, that the adhesive acquires its final properties. Polyurethane hotmelt adhesives in the narrower sense are largely free of solvents.

The main advantages of hotmelt adhesives over other adhesive systems lies in their very quick setting ability and in the absence of water and solvents in their composition.

Corresponding moisture-curing polyurethane hotmelt adhesives for bonding various substrates are known.

Thus, DE-A-32 36 313 describes a hotmelt adhesive containing a prepolymeric isocyanate, a thermoplastic polymer and a low molecular weight synthetic resin. The prepolymeric isocyanate is reactive polyurethane prepolymer of an aromatic diisocyanate and/or a prepolymer of this diisocyanate with a short-chain diol and of a polyether or a polyester containing OH groups and a short-chain diol.

This hotmelt adhesive is suitable for the bonding of thermoplastics and thermosets, foams, painted surfaces, rubber, textiles, nonwoven materials, leather, wood, metal and paper. For formulations that are intended to have high initial strengths and to be applied to porous materials, 5 to 40% by weight of the thermoplastic polyurethane has to be added. Unfortunately, this increases the melt viscosity with the result that these adhesives can only be applied by spraying at very high temperatures.

Also known is a moisture-curing hotmelt adhesive consisting of a polyurethane prepolymer A with hard and soft chain segments and terminal isocyanate groups and a urethane prepolymer B with soft chain segments and terminal isocyanate groups. The prepolymer A is prepared in steps from a thermoplastic saturated polyester polyol with a molecular weight of 1,000 to 6,000 and a melting point of 50° C. or higher, a polyol with a molecular weight of not more than 8,000 and a diisocyanate. The prepolymer B is prepared from a polyol with a molecular weight of not more than 8,000 and a diisocyanate. This polyol may be liquid at room temperature or may have a melting point below 50° C. 4,4'-diphenyl methane diisocyanate or toluene diisocyanate is said to be particularly preferred as the diisocyanate.

Unfortunately, these hotmelt adhesives require an elaborate production process. Either the prepolymer A and the prepolymer B are prepared in a three-stage process or the polymers have to be prepared in separate two-stage or one-stage processes and subsequently mixed. The melt viscosity of these adhesives at 120° C. is very high (>1 million mPas) so that not only are these adhesives expensive to produce, they are also unsuitable for spray application and other applications requiring low melt viscosity.

EP-A-340 906 describes a quick-setting polyurethane hotmelt adhesive consisting of a mixture of at least two amorphous polyurethane prepolymers, the two prepolymers having different glass transition temperatures. The first polyurethane prepolymer preferably has a glass transition temperature above room temperature while the second polyurethane prepolymer has a glass transition temperature below room temperature. The polyurethane prepolymer with the higher glass transition temperature preferably consists of a polyester diol and a polyisocyanate while the polyurethane prepolymer with the lower glass transition temperature preferably consists of a linear or lightly branched polyester or of a polyether. Aromatic diisocyanates, such as 4,4'-diphenyl methane diisocyanate or 2,4-toluene diisocyanate, are said to be preferred diisocyanates. The viscosities of these hotmelt adhesives at 130° C. are in the range from at least 30,000 to 90,000 mPas.

According to EP-B-354 527, hotmelt adhesives can be produced from reaction products of polyisocyanates and hydroxypolyesters, the hydroxypolyesters containing more than 50% by weight of a hydroxypolyester A. The hydroxypolyester A is synthesized from aliphatic diols, optionally ether diols and aliphatic dicarboxylic acids containing 8 to 12 methylene groups. The aliphatic dicarboxylic acids may optionally be partly replaced by aromatic dicarboxylic acids, although in a preferred embodiment at least 50 mole-% of the dicarboxylic acids consist of dodecanedioic acid. The very fast setting rate of these hotmelt adhesives is attributable to their rapid recrystallization in the glueline after application from the melt. Preferred fields of application are said to be the shoe industry, the wood-processing industry, the paper industry and the metal processing industry.

EP-A-369 607 describes quick-setting, moisture-curing polyurethane hotmelt adhesives based on polyurethanes which contain at least one polyether-based prepolymer with a glass transition temperature above room temperature and a second polyurethane prepolymer with a glass transition temperature below room temperature. The second polyurethane prepolymer may be based on an amorphous polyester, a linear or lightly branched polyether or a polybutadiene. Polyols with a molecular weight of, preferably, 250 to 800 and, more preferably, around 400 are proposed for the polyurethane prepolymer with the high glass transition temperature. This results in relatively high isocyanate contents in the final hotmelt adhesive so that it can only be applied in thin layers to avoid foaming under the effect of the carbon dioxide formed from the isocyanate-moisture reaction.

According to EP-A-248 658, polyurethane hotmelt adhesives can be produced from a reaction product of diisocyanates and crystalline polyester diols, the polyester diols having been prepared from symmetrical aromatic dicarboxylic acids and having an acid component of at least 50 mole-%. In preferred embodiments, the free isocyanate groups are blocked, for example by acetyl acetone. Although this measure reduces the sensitivity of the hotmelt adhesive to moisture and thus increases stability in storage, the setting rate is significantly increased because the isocyanate group first has to be converted back into its reactive form in a deblocking step in view of the application temperature.

EP-A-472 278 describes an adhesive composition consisting of a polyalkylene ether diol, a polyalkylene ether triol, a polyester polyol and an aliphatic isocyanate compound. The isocyanate compound is preferably a non-aromatic, cyclic or linear aliphatic organic polyisocyanate with a functionality of 2 to 4 and preferably 2 to 3. The polyalkylene ether diols are, in particular, polytetramethylene ether diol, polyethylene glycol, polypropylene glycol or polybutylene ether diol, the polytetramethylene glycols being preferred. The polypropylene ether triols are preferred for the polyalkylene ether triols. The preferred polyester polyol is a lactone-based polyester polyol, such as polycaprolactone for example, a polycaprolactone triol from the reaction of caprolactone with trimethylol propane being particularly preferred. The effectiveness of this hotmelt adhesive is attributed to the relatively high crystallinity of the polyester polyol-based urethane segment. The adhesive composition is suitable for use on fabrics, nonwoven materials, wood, metal, leather and plastics. The melt viscosities of the adhesives are not mentioned.

Also, a modified polyurethane adhesive composition has been described consisting of an isocyanate-terminated prepolymer with a molecular weight of at least 1,000 and 2.5 to 100% by weight, based on the above prepolymer, of a dicarbamate ester reaction product of 2 moles of an organic diisocyanate and 1 mole of a low molecular weight dihydroxy compound such as, for example, ethylene glycol, diethylene glycol, propylene glycol, butane-1,4-diol, etc. The dicarbamate ester has to be subsequently added to the polyurethane prepolymer because it cannot be added during polymerization of the prepolymer. This involves an additional working step that makes the product even more expensive to produce. The lamination of films and packaging materials, the lamination of insulating materials and the production of cushioning for the automotive industry are mentioned as typical applications.

EP-A-511 566 describes a polyurethane hotmelt adhesive of a polyfunctional polyether and/or polyester polyol which is liquid or highly viscous at room temperature, a polyfunctional polyol component with a molecular weight of 500 to 10,000, which is crystalline at room temperature, and a mixture of polyisocyanates. The mixture of the polyisocyanate component contains an isocyanate with two differently reactive isocyanate groups and a diisocyanate with an isocyanate reactivity to hydroxyl groups which is greater than that of the less reactive isocyanate group of the polyisocyanate component containing the two differently reactive isocyanate groups. The polyisocyanate component containing the differently reactive isocyanate groups is preferably 2,4-toluene diisocyanate or asymmetrically substituted derivatives of diphenyl methane diisocyanate or isophorone diisocyanate. In a preferred embodiment, the second diisocyanate compound is 4,4'-diphenyl methane diisocyanate or hexamethylene diisocyanate. OH-functional polyester polyols, preferably condensation products of adipic acid with butane-1,4-diol or hexane-1,6-diol, are mentioned as the polyol component crystalline at room temperature. Mixtures of OH-functional polyether polyols, for example polypropylene glycols and/or polyethylene glycols, are mentioned as the polyol component that is liquid or highly viscous at room temperature. The high-viscosity hotmelt adhesives are particularly suitable for the bonding of windowpanes and headlamp diffusers, i.e. glass/plastic composites for the automotive industry. Further particulars of preferred applications are not provided.

Further low viscosity reactive urethane hot melt adhesive compositions are known that consist of:

a low molecular weight polymers formed from ethylenically unsaturated monomers which do not contain active hydrogen a urethane prepolymer having an isocyanate content of 0.25 to 15% and an isocyanate index greater than 1 and no more than about 2.

This hot melt having a viscosity of 3000 to 50000 mPas at 120° C. can be readily coated to substrates to be bonded. According to this reference, there is no need to incorporate plasticizers and/or tackifiers into the adhesive formulation. In a preferred embodiment, the low molecular weight polymers are formed by polymerization of the ethylenically unsaturated monomers having no active hydrogen in the non-isocyanate containing components of the isocyanate-terminated prepolymer prior to their reaction with the polyisocyanate.

Also disclosed are hotmelt adhesives wherein the low molecular weight polymer of ethylenically unsaturated monomers contains at least one moisture reactive functional group but having no active hydrogen. This functional group may be an alkoxysilane group or an isocyanate group.

U.S. Pat. No. 5,866,656 describes polyurethane hotmelt adhesives based on reactive acrylic copolymers. The acrylic copolymer must comprise at least 30% by weight of the adhesive, have sufficient hydroxyl functionality to provide an OH number of 5 to 15 and have a relatively low number average molecular weight in the range of approximately 4000 to 15,000 (preferably, no more than 12,000). Gelling of the adhesive composition was observed using an acrylic copolymer having an OH number of 10 and a number average molecular weight greater than 15,000 (Table 1, Samples B, E & G).

U.S. Pat. No. 5,506,296 discloses moisture-curable hotmelt adhesives comprised of polyisocyanated EVA terpolymers. The terpolymers comprise 60–90 wt. % ethylene, 10–40 wt. % vinyl acetate and 5–60 meq OH of an ethylenically unsaturated termonomer bearing at least one primary hydroxyl functional group per mole. Excess isocyanate is used, which is neutralized by a monoalcohol. The use of polyester polyols, polyether polyols or acrylic-based resins in such adhesives is not suggested.

U.S. Pat. No. 5,922,805 discloses polyurethane-based hotmelt adhesives resulting from the polyaddition of a polyisocyanate, a polyol, and a copolymer of ethylene, vinyl acetate and 5 to 100 meq OH of an ethylenically unsaturated monomer containing at least one primary hydroxyl group per mole. The only copolymer actually used in the working examples contained 20 meq OH (corresponding to a hydroxy number of 11 mg KOH/g). The patent does not teach or suggest that there might be any advantage or benefit to selecting a copolymer having a significantly lower hydroxy number.

Most known moisture-curing polyurethane hotmelt adhesives have serious drawbacks which, hitherto, have been an obstacle to economic use in a number of adhesive applications. The properties in need of improvement are inter alia:

The adhesive should be able to be applied at low melt temperatures so that heat-sensitive substrates (e.g. polyolefin foams) can be bonded.

The adhesive should have a low viscosity at the application temperatures to ensure that spraying or roller coaters can also apply it.

The open time should be readily adjustable to meet customer requirements.

Inexpensive standard polyether polyols or polyester polyols should be able to be used.

The production process should be simple, i.e. the number of components required should be as small as possible.

The product should adhere to many different substrates.

The adhesive bond should be sufficiently strong and yet flexible in use, in addition to which adequate creep strength should be guaranteed.

The viscosity of the molten adhesive should be sufficiently stable during production, packaging and application. In particular, the adhesive should be stable enough to be applied at high temperatures using large open roll coaters such as those available from equipment suppliers Black Brothers (Mendota, Ill., U.S.A.) and Union Tool (Warsaw, Ind., U.S.A.). In such applications, the adhesive is typically held at about 120 degrees C. to about 125 degrees C. while constantly exposed to attack by atmospheric moisture. The rate of viscosity increase exhibited by the adhesive under such conditions must be sufficiently slow that the adhesive is still coatable for at least hour from initial exposure to such conditions.

While hot melt adhesives made according to the prior art attempt to solve many of the problems listed above, they have significant disadvantages:

If the low molecular weight polymer incorporated into the adhesive formulation does not contain any functional groups it has no chemical bond into the adhesive backbone after the adhesive is cured. Thus it is readily extractable from the cured adhesive by solvents being in contact with the bond line. Moreover, plasticizers migrating from the interface of the bondline of plasticized substrates also extract significant portions of the low molecular weight polymer of the cured adhesive. This loss of low molecular weight component due to solvent and/or plasticizer contact is highly undesirable, since it changes the physical, chemical and especially mechanical properties of the bondline and thus the performance of the bonded parts.

If the low molecular weight polymer contains moisture reactive functional groups like alkoxysilanes or isocyanates, they have to be made, stored and handled under anhydrous conditions prior to their incorporation into the hot melt adhesive composition.

In addition, on exposure to moisture, an alkoxysilane group splits off a monofunctional alcohol which acts as chain stopper for the isocyanate groups from the hot melt composition. Such a chain stopping effectively impairs the crosslinking process, thus reducing the final strength of the cured adhesive.

The problem to be solved by the present invention was to retain the favorable properties of reactive polyurethane hot melt adhesives containing low molecular weight polymer, to improve on their resistance to solvents and/or plasticizers, and to improve the viscosity stability of the molten adhesive.

Note that all quantities used hereinafter are, except in the examples, to be understood as being modified by "about".

SUMMARY OF THE INVENTION

The solution according to the invention is defined in the claims and comprises a largely solvent-free moisture-curing polyurethane hot melt composition which is solid at room temperature comprising 95 to 3% by weight of the reaction product of a polyisocyanate and a low molecular weight polymer comprising ethylenically unsaturated monomers, wherein said polymer has active hydrogen groups, 5 to 90% by weight of at least one polyurethane prepolymer with free isocyanate groups prepared from at least one polyol selected from the group consisting of polyether diols, polyether triols, polyester polyols and mixtures thereof and at least one polyisocyanate, and 0 to 40% by weight of additives selected from the group consisting of tackifiers, plasticizers, fillers, pigments, stabilizers, adhesion promoters and mixtures thereof, its use and articles of manufacture made therewith.

DETAILED DESCRIPTION OF THE INVENTION

A "polyurethane prepolymer" is understood to be an oligourethane containing reactive isocyanate groups which is formed by the reaction of hydroxyfunctional compounds with a more than stoichiometric quantity of polyisocyanates, thus resulting in compounds with free (reactive) isocyanate groups. Polyisocyanates in this context are preferably low molecular weight compounds containing two isocyanate groups, although they may contain up to 10% by weight of trifunctional and/or higher functional isocyanate. However, unwanted crosslinking may be observed both in the production and in the use of the hotmelt adhesive if the amount of polyisocyanates with functionality of three or more is too high.

Although aromatic polyisocyanates are the most preferred isocyanates, aliphatic and/or cycloaliphatic polyisocyanates may also be used.

Examples of suitable aromatic polyisocyanates include: any isomers of toluene diisocyanate (TDI) either in the form of pure isomers or in the form of a mixture of several isomers, naphthalene-1,5-diisocyanate (NDI), naphthalene-1,4-diisocyanate (NDI), 4,4'-diphenylmethane-diisocyanate (MDI), 2,4'-diphenylmethane-diisocyanate (MDI), xylylenediisocyanate (XDI), 2,2-diphenylpropane-4,4'-diisocyanate, p-phenylene diisocyanate, m-phenylene diisocyanate, diphenyl-4,4'-diisocyanate, diphenylsulphone-4,4'-diisocyanate, 1-chlorobenzene-2,4-diisocyanate, 4,4', 4"-triisocyanato-triphenyl-methane, 1,3,5-triisocyanato-benzene, 2,4,6-triisocyanato-toluene and furfurylidene diisocyanate. Examples of suitable cycloaliphatic polyisocyanates include 4,4'-dicyclohexylmethane diisocyanate ($H_{12}$MDI), 3,5,5-trimethyl-3-isocyanatomethyl-1-isocyanato-cyclohexane (isophorone-diisocyanate, IPDI), cyclohexane-1,4-diisocyanate, cyclohexane-1,2-diisocyanate, hydrogenated xylylene diisocyanate ($H_6$XDI), m- or p-tetramethylxylylene diisocyanate (m-TMXDI, p-TMXDI) and diisocyanate from dimer acid. Examples of aliphatic isocyanates include hexane-1,6-diisocyanate (HDI), 2,2,4-trimethylhexane-1,6-diisocyanate, 2,4,4-trimethylhexane-1,6-diisocyanate, butane-1,4-diisocyanate and 1,12-dodecane diisocyanate ($C_{12}$DI). Particularly preferred for maximum formulation stability is a liquid mixture of 4,4'-diphenylmethane-diisocyanate and 2,4'-diphenylmethane-diisocyanate.

Under certain conditions it may be advantageous to use mixtures of the above mentioned polyisocyanates.

Hydroxyfunctional compounds (i.e., "polyols") for making the polyurethane prepolymer may be selected from polyetherpolyols, polyester polyols and/or aromatic polyols.

A "polyether polyol" is understood to be a linear polyether containing predominantly two OH groups. The preferred polyether polyols are diols corresponding to the general formula HO(—R—O)$_m$—H, where R is a hydrocarbon radical containing 2 to 4 carbon atoms and m is in the range from 4 to 225 on average. Specific examples of such polyether polyols include polyethylene glycol, polybutylene glycol, polytetramethylene glycol (polyTHF) and, above all, polypropylene glycol (R=—$CH_2CH(CH_3)$—). Such polyether polyols may be prepared by known methods such as, for example, polymerization of one or more cyclic ether monomers such as ethylene oxide, propylene oxide, n-butene oxide, and tetrahydrofuran. The polyether polyols may be used both as homopolymers and as copolymers, both as block copolymers and as statistical (random) copolymers. Only one type of polyether polyol is preferably used, although mixtures of 2 to 3 polyether polyols differing in their average molecular weight and/or in the nature of their structural elements may also be used. Small quantities of a trifunctional polyether polyol (i.e., a polyether triol) may also be present in the mixture. The average molecular weight (number average molecular weight) of the polyether polyols is in the range from 200 to 10,000 and preferably in the range from 400 to 6,000.

A "polyester polyol" is understood to be a polyester having more than 1 OH group, preferably 2 terminal OH groups. Preparation is by known routes, either from
  a) aliphatic hydroxycarboxylic acids, or from
  b) aliphatic and/or aromatic dicarboxylic acids having from 6 to 12 C atoms and—particularly even-numbered—diols having from 4 to 8 C atoms.

Of course, other appropriate derivatives may be used, e.g., lactones, methyl esters or anhydrides. Specific starting materials include: 1,4-butanediol, 1,6-hexanediol, 1,10-decanediol, 1,12-dodecanediol, adipic, azelaic and sebacic acids, 1,10-decanedicarboxylic acid and lactones. The acid component may include up to 25% on a molar basis of other acids, for example, cyclohexanedicarboxylic acid, terephthalic acid and isophthalic acid. The glycol component may include up to 15% on a molar basis of other diols, for example, diethylene glycol and 1,4-cyclohexanedimethanol. In addition to homopolymers from the above components, above all, copolyesters from the following components or derivatives thereof are of importance:

1. adipic acid, isophthalic acid, phthalic acid, and butanediol;
2. adipic acid, phthalic acid and hexanediol;
3. adipic acid, isophthalic acid, phthalic acid, ethylene glycol, neopentylglycol, and 3-hydroxy-2,2-dimethylpropyl-3-hydroxy-2,2-dimethyl propanoate;
4. adipic acid, phthalic acid, neopentylglycol, and ethylene glycol; and
5. adipic acid and hexanediol.

The copolyester from adipic acid, isophthalic acid, phthalic acid, and butanediol is partially crystalline and has a high viscosity. Hence, it results in high initial strength. The copolyester from adipic acid, phthalic acid and hexanediol has low glass transition temperature and therefore, results in improved low-temperature flexibility.

The suitable polyester polyols may optionally be lightly branched, i.e. small quantities of a tricarboxylic acid or trihydric alcohol have been used in their production.

Thus, the polyester polyols are either liquid or solid. In case they are solid, they are preferably amorphous. However, they can be weakly crystalline as well. Preferably, a mixture of partially crystalline and amorphous polyesters is employed. However, crystallinity is developed so weakly that it does not become noticeable as opaqueness in the final hot-melt adhesive. The melting point of the partially crystalline polyester is in the range of from 40 to 70° C., preferably in the range of from 45 to 65° C. The melting point indicates the temperature at which the crystalline regions of the material will melt. It is determined by differential thermoanalysis through the main endothermic peak. Preferably, a polyhexanediol adipate having a molecular weight of about 3000 to about 4000 and a melting point of about 60° C. is used as the partially crystalline polyester glycol. A polybutanediol adipate having a molecular weight of about 3000 to about 4000 and a melting point of about 50° C. can also be used as the partially crystalline polyester glycol.

The average molecular weight (Mn) of the polyester polyol should be between 1,500 and 30,000, preferably between 2,500 and 6,000. It is calculated from the OH number. The molecular weight of the polyester polyol is of some significance: An increasing molecular weight makes extrusion of the hot-melt adhesive and penetration into porous substrates more difficult, and a decreasing molecular weight results in that the hot-melt adhesive is not sufficiently solid at room temperature.

The polyester polyols have a glass transition temperature (Tg) in the range of preferably from −40° C. to +50° C. and, in particular, in the range of from −40° C. to +40° C. The Tg is determined on the basis of DSC measurements as the center point of the step using a ratio of 10° C./min in the second run.

Particularly suitable polyester polyols include those having a glass transition temperature of about −40° C. to +40° C., a viscosity of 3,000 to 30,000 mPas.s at 130° C. (Brookfield, RVDV II+Thermosel) and a hydroxyl number of 2 to 80, preferably 2 to 40 mg KOH/g.

An "aromatic polyol" is understood to be an alkoxylation product of an aromatic polyhydroxy compound. These are, in particular, the reaction products of ethylene oxide and/or propylene oxide with aromatic dihydroxy compounds such as, for example, hydroquinone, resorcinol, pyrocatechol, bis-(hydroxydiphenyl), bisphenol A, bisphenol F, isomers of dihydroxynaphthalene (pure isomers or a mixture of several isomers), isomers of dihydroxyanthracene (pure isomer or isomer mixture) or isomers of dihydroxyanthraquinone. 1 to 7 alkoxy units have preferably been added per aromatic hydroxy group.

The "low molecular weight polymer from ethylenically unsaturated monomers having active hydrogen" is understood to be a polymer made from one or more of the following comonomers including: $C_1$ to $C_{18}$-alkylesters of acrylic acid, $C_1$ to $C_{18}$-alkylesters of methacrylic acid, acrylic acid, methacrylic acid, hydroxyethylacrylate, hydroxyethylmethacrylate (HEMA), hydroxypropylacrylate, hydroxypropylmethacrylate, hydroxybutylacrylate, hydroxybutylmethacrylate, esters of (meth)acrylic acid and glycol oligomers and polymers such as di-, tri-, tetra- and/or polyethyleneglycol, esters of (meth) acrylic acid and glycol ethers such as methoxyethanol and/or ethoxyethanol, vinylesters like vinylacetate, vinylpropionate, vinyl esters of highly branched monocarboxylic acids (such as the vinyl ester of the Versatic acid sold by Shell Chemicals), vinylethers, fumarates, maleates, styrene, alkylstyrenes, butadiene as well as acrylonitrile. In a preferred embodiment of the invention, the low molecular weight polymer is essentially free of repeating units obtained from unfunctionalized monomers such as olefins (e.g., ethylene). Instead of or in addition to the hydroxy-functional (meth)acrylates, the corresponding aminofunctional monomers may be used. The choice of the particular monomer or monomer mixture is largely dependant upon the desired end use of the adhesives including the suitability for the application equipment to be used. "Low molecular weight polymers" in the sense of the present invention means an average molecular weight below 100,000. A preferred average molecular weight range is between 10,000 and 90,000, the most preferred range between 20,000 and 80,000. The average molecular weight is determined by standard gel permeation chromatography (GPC) sometimes also called size exclusion chromatography (SEC). It is the weight average molecular weight (MW) as calibrated against an external polystyrene-standard of certified molecular weight. As mentioned earlier the low molecular weight polymers of the present invention have active hydrogen groups preferably in the form of OH-groups, however amine groups and/or carboxylic groups may also be present. The amount of active hydrogen groups is determined by their OH-number as specified in DIN 53783. The OH-number of these low molecular weight polymers should be in the range between 0.5 and 20, preferably between 1 and 15, the most preferred range being 1 to 4 mg KOH/g. It has surprisingly been discovered that adhesives prepared using low molecular weight polymers having a relatively low hydroxyl number (e.g., 1 to 4 mg KOH/g) exhibit better stability and a less rapid rate of viscosity increase than adhesives prepared using analogous polymers having a higher hydroxyl number. This means that the open time for an adhesive being applied by a means requiring exposure to atmospheric moisture may be effectively extended. In terms of weight average hydroxyl functionality, it is preferred that this value be between about 0.9 and about 8. Particularly preferred is a low molecular weight polymer having a weight average hydroxyl functionality between about 1.2 and about 5. The weight average hydroxyl functionality is equal to the weight average molecular weight of the polymer times the weight fraction of hydroxy functional monomer (like, hydroxyethylmethacrylate, for example) divided by the molecular weight of the hydroxy functional monomer.

The low molecular weight (MW) polymers having active hydrogen groups are thermoplastic polymers and may be produced by known procedures, i.e. they may be made by ionic, thermal and preferably by a free radical polymerization. The active hydrogen groups may be incorporated into the polymer by using a free radical starter having active hydrogen groups and/or by using a chain transfer agent bearing active hydrogen groups. Adding small amounts of comonomers bearing active hydrogen groups such as the above mentioned hydroxyfunctional (meth)acrylate monomers to the monomer mix is a third viable alternative. Whereas the first two methods generate predominantly terminal functional groups, the third method generates functional groups statistically distributed along the polymer chains. Further details for all three methods can be found for example in EP-A-205846 and the references cited there. Since these polymers are produced via free radical polymerization, the functional groups will be randomly distributed on the individual polymer chains.

This implies that, especially with very low OH-numbers, a certain number of polymer molecules may not bear any functional group whereas others may bear two or more functional groups.

The low MW polymers with an active hydrogen group may be made according to any known aqueous or anhydrous polymerization process. They may also be polymerized in one or more of the polyether polyol(s) and/or polyester polyol(s).

Contrary to the teachings of U.S. Pat. No. 5,866,656, it has been found that significant improvements in adhesive properties may be attained using amounts of the low molecular weight polymer representing less than 30% of the total weight of the adhesive. The range of about 20 wt % to about 28 wt % is generally preferred.

The hot melt adhesive according to the present invention may additionally comprise one or more of the following: catalysts, stabilizers, tackifying resins, fillers, pigments, plasticizers, adhesion promoters, flame retardants, conductive agents and/or rheology improvers.

The optional catalysts may accelerate the formation of the polyurethane prepolymer during its production and/or the moisture curing/crosslinking process after application of the hotmelt adhesive. Suitable catalysts are the normal polyurethane catalysts such as, for example, compounds of divalent and tetravalent tin, more particularly the dicarboxylates of divalent tin and the dialkyl tin dicarboxylates and dialkoxylates. Examples of such catalysts are dibutyl tin dilaurate, dibutyl tin diacetate, dioctyl tin diacetate, dibutyl tin maleate, tin(II) octoate, tin(II) phenolate or even the acetyl acetonates of divalent and tetravalent tin. The highly effective tertiary amines or amidines may also be used as catalysts, optionally in combination with the tin compounds mentioned above. Suitable amines are both acyclic and, in particular, cyclic compounds. Examples include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether or dimethyl piperazine or even mixtures of the amines mentioned above.

However, it has been unexpectedly found that for applications requiring optimal machinability, it is desirable to minimize, or eliminate, tin catalysts.

"Stabilizers" in the context of the present invention include stabilizers that stabilize the viscosity of the polyurethane prepolymer during its production, storage and application. Suitable stabilizers of this type include, for example, monofunctional carboxylic acid chlorides, monofunctional highly reactive isocyanates and non-corrosive inorganic acids. Examples of such stabilizers are benzoyl chloride, toluene sulfonyl isocyanate, phosphoric acid or phosphorous acid. In addition, stabilizers in the context of the present invention include antioxidants, UV stabilizers or hydrolysis stabilizers. The choice of these stabilizers is determined on the one hand by the main components of the hotmelt adhesive and on the other hand by the application conditions and by the loads to which the bond is likely to be exposed. When the polyurethane prepolymer is predominantly made up of polyether units, antioxidants—optionally in combination with UV stabilizers—are mainly necessary. Examples of suitable antioxidants include the commercially available sterically hindered phenols and/or thioethers and/or substituted benzotriazoles. In cases where key components of the polyurethane prepolymer consist of polyester units, hydrolysis stabilizers, for example of the carbodiimide type, are preferably used.

Examples of suitable tackifying resins include abietic acid, abietic acid esters, terpene resins, terpene/phenol resins or hydrocarbon resins. Examples for fillers include silicates, talcum, calcium carbonates, clays or carbon black. Suitable rheology improvers imparting thixotropy or sag resistance are for example BENTONE (a rheological additive available from Rheox), pyrogenic (fumed) silicas, urea derivatives and fibrillated or pulp chopped fibers.

Although frequently no additional adhesion promoters are required, the above mentioned tackifying resins like abietic acid, terpene resins, terpene/phenol resins or hydrocarbon resins also act as adhesive promoters. In special cases organofunctional silanes like the epoxy functional 3-glycidyl-oxypropyl-trialkoxysilane or the isocyanatefunctional isocyanatoethyl trisalkoxysilane, epoxy resins, melamine resins or phenolic resins may be added as adhesion promoters.

The polyurethane hotmelt adhesive composition according to this invention may be prepared, for example, in the following three different ways:

In a two step procedure, the functional group-containing low molecular weight polymer from ethylenically unsaturated monomers and the polyol or polyol mixture are each separately reacted with the polyisocyanate component. In a subsequent step the thus formed isocyanate group tipped prepolymer(s) including the NCO-group tipped low MW polymer are mixed, optionally followed by the blending in of catalysts, stabilizers, tackifying resins, fillers, pigments and the like. It may be necessary to dissolve the low molecular weight polymer in a low boiling inert solvent prior to reaction with the polyisocyanate. If so, the solvent will be flashed off at a later stage of the production.

In another embodiment, the functional group-containing low MW polymer from ethylenically unsaturated monomers is reacted with a stoichiometric excess of isocyanate in an continuous internal mixer or in an extruder with sufficient residence time to allow complete reaction of the functional groups with the polyisocyanate. The subsequent mixing can also be made in the internal mixer or extruder. It can also be made in any suitable mixer capable of homogenizing high viscosity components under the exclusion of moisture.

In a one step procedure, the functional group-containing low molecular weight polymer from ethylenically unsaturated monomers and the polyol or polyol mixture are homogenized, followed by reaction of this blend with the polyisocyanate. Blending in of the auxiliary components mentioned above may follow.

The preferred mixing equipment for the one step procedure is also an internal mixer/extruder type mixing equipment since the high viscosity components need to be homogenized quickly especially during and immediately after the addition of the polyisocyanate.

In a preferred embodiment, the functional group-containing low MW polymer from ethylenically unsaturated monomers is mixed with a small portion of the polyol or polyol mixture. The viscosity of this mixture should not exceed 80,000 mPas at 130° C. prior to the addition of polyisocyanate, thus allowing the use of conventional stirred tank mixing equipment. This mixture is then reacted with all of the polyisocyanate followed by the addition of the remaining portion of the polyol or polyol mixtures.

This procedure avoids the use of solvents during production without risking partial gelation even when using low MW polymers from ethylenically unsaturated monomers having high OH- or NH-functionality. Moreover, during the entire reaction, the viscosity of the composition remains low enough to avoid a high powered extruder as mixing equipment.

The viscosity of the resultant polyurethane hotmelt compositions according to the present invention preferably ranges from 2,000 to 50,000 mPas at 130° C. As discussed previously, these compositions are solid at room temperature.

Due to their rapid solidification on cooling these adhesives exhibit a high initial adhesive and cohesive strength even before complete curing/crosslinking reaction of the isocyanate groups with moisture from the air and/or from the bonded substrate. This ensures a rapid high handling strength of the bonded substrates which can be readily subjected to further processing operations without the necessity of mechanical fixing and/or fastening.

Due to these properties, the hotmelt adhesives according to this invention can be readily adapted to a variety of applications where hotmelts are commonly used, especially for demanding applications requiring:

a high degree of heat resistance moisture resistance resistance to solvent and/or plasticizer attack.

Typical applications include, but not limited to, laminating wood working industry including bonding of wooden panels, automotive interior assembly, roof panel bonding, fabrication of nonwoven fabrics, fabrication of grinding discs, grinding paper and the like.

It is believed, that the superior properties of the hotmelt adhesive according to the present invention are due to the at least partial chemical bonding of the low MW polymer from ethylenically unsaturated monomers to the polyurethane polymer.

EXAMPLES

The invention will be further illustrated by the following examples. However, it will be understood that these examples are not intended to limit the scope of the invention; they are included to illustrate preferred embodiments of the invention.

A typical formula would be:
25–40 parts by weight (pbw) PPG
10–20 pbw ELVACITE 2820
13–19 pbw MDI
15–30 pbw Polyester diol
2 pbw MODAFLOW 2100 where:

PPG is polypropylene glycol
MDI is either 4,4'- or 2,4'/4,4' mixture
ELVACITE 2820 is OH-containing ELVACITE 2013. It has a CAS # of 35227-05-5.
CAS name: poly~(methyl methacrylate/methacrylic acid/2-hydroxyethyl methacrylate/n-butyl methacrylate). Weight average molecular weight around 25K. Functionality average around 1.5–2. ELVACITE is a trademark of ICI Acrylics, Wilmington, Del.
MODAFLOW 2100 is a non-reactive surface coatings additive available from Monsanto.

Example 1

Was made as described above.

PPG-1025:38 pbw
ELVACITE 2901:23 pbw
MONDUR ML: 17.5 pbw
MODAFLOW 2100:1.5 pbw
RUCO S-105-30:20 pbw Note:
PPG 1025 is Polypropylene glycol, MW=1000.
ELVACITE 2901: Methylmethacrylate/butylmethacrylate copolymer with 1.5 wt % HEMA.
MONDUR ML: 2,4'/4,4'-MDI mixture available from Bayer
MODAFLOW 2100: Flowing agent.
RUCO S-105-30: Poly(hexane adipate) diol available from RUCO. MW~3500.

Example 2

Was made as described above.

| | |
|---|---|
| PPG-1025: | 18 pbw |
| PPG-2025: | 22 pbw |
| ELVACITE 2901: | 25 pbw |
| MONDUR ML: | 15.7 pbw |
| MODAFLOW 2100: | 1.5 pbw |
| RUCO S-105-30: | 11.5 pbw |
| RUCO XS-7129: | 6.3 pbw |

Note: PPG-2025 is polypropylene gylcol having a molecular weight of about 2000. RUCO XS-7129 is a polyester diol available from RUCO.

Examples 3 to 9 and Comparative Example

Reactive hotmelt adhesive compositions were made from the following 44.2 pbw polypropylene glycol diol, MW 2000, OH-number 56
17.7 pbw poly(hexane adipate)diol, MW~3500
24.5 pbw OH-group containing methacrylate containing copolymer similar to ELVACITE 2013
about 10.2 pbw MDI (2,4'/4,4'-blend)
0.03 pbw toluenesulphonylisocyanate as stabilizer.

In the individual formulations, the amount of MDI was adjusted to accommodate an NCO:OH ratio of 1.65.

As can be seen from Table 1, the hot melt adhesive compositions of examples 2 to 7 are good as the state of the art, comparative example (containing the non-functional methacrylate copolymer ELVACITE 2013) with respect to open time, set time of viscosity range and viscosity stability. Viscosity stability is determined by keeping the adhesive composition (with exclusion of moisture) for 16 hours at 130° C. Also shear strength after final cure, i.e. after 7 days exposure to moisture at room temperature and elevated temperatures are at least equivalent to the state of the art.

For determining extractable matter from the cured adhesive compositions, cured samples were subjected to soxhlet extraction with methylene chloride for 6 hours. Subsequently the extracted samples were dried in a ventilated oven at 75° C., to determine the extracted matter by weight loss. The cured samples made from the compositions according to the invention outperform the state of the art composition by a factor of two in terms of reduction of extractable matter.

The adhesives were tested for adhesion properties on the following substrates (see Table 2): soft PVC, i.e. plasticized PVC, rigid PVC, polyethylene (PE, fluorine-surface-treated), paper, light colored ABS (acrylonitrile-butadiene-styrene), black colored ABS, PS (polystyrene).

Whereas there is little to no difference in adhesion performance on PS, ABS, paper or soft PVC, the compositions of the present invention exhibit significantly better adhesion to the fluorinated polyethylene and to rigid PVC. Adhesion of the adhesives according to the invention on fluorinated PE or rigid PVC was at least fair or good, whereas the comparative example performed only poor or fair respectively.

TABLE 1

| Example | Acrylic copolymer MW | OH-number | open time [sec] | set time [sec] | Viscosity (130° C.) [mPa·s] | viscosity (16 h/130° C.) [mPa·s] | shear strength at RT [Mpa] | shear strength at 80° C. [Mpa] | shear strength at 100° C. [Mpa] | shear strength at 130° C. [Mpa] | extractable matter [% bw] |
|---|---|---|---|---|---|---|---|---|---|---|---|
| 3 | 21000 | 2.0 | 360 | 120 | 1825 | 3800 | 7.4 | 1.9 | 1.9 | 2.2 | 13.9 |
| 4 | 34000 | 2.0 | 210 | 80 | 6300 | 8200 | 9.3 | 1.3 | 1.1 | 1.1 | 13.6 |
| 5 | 12000 | 8.6 | 390 | 130 | 3550 | 11950 | 6.3 | 1.8 | 1.0 | 1.2 | 15.9 |
| 6 | 21000 | 8.6 | 380 | 65 | 6180 | 16700 | 7.4 | 1.9 | 1.8 | 1.2 | 11.6 |
| 7 | 34000 | 2.0 | 100 | 30 | 14150 | 20300 | 8.3 | 1.7 | 1.7 | 1.1 | 16.2 |
| 8 | 21000 | 3.9 | 190 | 100 | 3750 | 8350 | | | | | |
| 9 | 21000 | 3.9 | 200 | 110 | 2715 | 4725 | | | | | |
| Comparative | 34000 | 0.0 | 240 | 40 | 9300 | 14250 | 9.0 | 1.8 | 1.6 | 1.1 | 26.8 |

TABLE 2

| Example | soft PVC | Rigid PVC | PE (fluorin.) | paper | ABS light [Mpa] | ABS black [Mpa] | PS [Mpa] |
|---|---|---|---|---|---|---|---|
| 4 | E | e | g | sf | 6.6 | 5.4 | 6.6 |
| 6 | E | e | g | sf | 6.4 | 3.6 | 5.6 |
| 8 | G | e | f | sf | 6.0 | 3.4 | 5.6 |
| 9 | G | g | f | sf | 4.9 | 5.1 | 5.2 |
| comp. | G | f | p | sf | 4.8 | 4.1 | 5.1 | e = excellent
g = good
f = fair
p = poor
sf = substrate failure

Note
    The composition of example 7 contained 44.2 pbw of a blend of 79% bw of polyoxypropylene diol and 21% bw of polyoxypropylene triol based on total polyetherpolyol in addition to the poly (hexaneadipate) diol.

Example 10

The following components were used to prepare a moisture-curing polyurethane hot melt adhesive:

| | Wt, g. | Wt, % |
|---|---|---|
| Polypropylene Glycol (1000 MW) | 420 | 21.0 |
| Polypropylene Glycol (2000 MW) | 420 | 21.0 |
| Polyester Polyol | 374 | 18.7 |
| MDI | 286 | 14.3 |
| Acrylic Copolymer | 500 | 25.0 |

DYNACOLL 7360, available from Creanova, was used as the polyester polyol. This is a partly crystalline copolyester based on adipic acid and hexanediol with a hydroxyl value of 27 to 34 mg KOH/g, an acid value of <2 mg KOH/g, a melting point of 60° C., and a molecular weight (calculated from hydroxyl value) of about 3500. ELVACITE 4014, available from ICI Acrylics, was used as the acrylic copolymer. This is a copolymer containing 0.25 weight % hydroxyethyl methacrylate and having a weight average molecular weight of 60,000. The hydroxyl number (calculated from the HEMA content) is 1.1 mg KOH/g.

The adhesive was prepared by adding the polypropylene glycol and the acrylic copolymer to a melt vessel and heating the mixture to 300° F. (149° C.) until the acrylic copolymer dissolved. The mixture was then added to a two gallon Ross planetary mixer/reactor containing the polyester polyol and mixed further under vacuum at 240° F. (116° C.) for 30 minutes. The MDI was thereafter added and the entire mixture mixed under vacuum for one hour at a temperature range of 230° F. (110° C.) to 250° F. (121° C.) to yield the moisture-curing polyurethane hotmelt adhesive.

Example 11

Example 10 was repeated, but with the substitution of ELVACITE 2820 for ELVACITE 4014 as the acrylic copolymer. ELVACITE 2820, available from ICI Acrylics, is a copolymer containing 2.2 weight % hydroxyethyl methacrylate and having a weight average molecular weight of 52,000. The hydroxyl number (calculated from the HEMA content) is 9.5 mg KOH/g.

The stabilities of adhesives obtained in Examples 10 and 11 were evaluated using the following procedure. An 11 g sample of adhesive was placed in a thermosel test tube designed for use with a Brookfield RVT viscometer equipped with a thermosel and a Brookfield 74R temperature controller. The test tube containing the sample was placed into the thermosel, which was preset at a temperature of 250° F. (121° C.). A #28 spindle was used at 20 RPM for the duration of the test. The spindle was placed into the adhesive sample at ambient conditions of 19° C. and 62% relative humidity and the viscosity of the adhesive sample measured at periodic, intervals, as shown in Table 3.

TABLE 3

| | Example 10 | | Example 11 | |
|---|---|---|---|---|
| Time, hr. | Viscosity, cps | % Change | Viscosity, cps | % Change |
| 0.5 | 5125 | — | 9375 | — |
| 1 | 5250 | 2 | 9750 | 4 |
| 2 | 5500 | 7 | 10625 | 13 |
| 3 | 5750 | 12 | 11500 | 23 |
| 4 | 6000 | 17 | 12500 | 33 |
| 5 | 6250 | 22 | 13375 | 43 |
| 6 | 6500 | 27 | 14375 | 53 |
| 7 | 6750 | 32 | 15375 | 64 |
| 8 | 7000 | 37 | 16500 | 76 |

The adhesive prepared using an acrylic copolymer having a relatively low hydroxyl number (Example 10) unexpectedly exhibited better viscosity stability upon prolonged exposure to an elevated temperature than did the adhesive prepared using an acrylic copolymer of comparable molecular weight having a relatively high hydroxyl number (Example 11). This slower rate of viscosity increase would be of significant advantage in applications where the adhesive is to be applied to a substrate by means of an open roll coater.

Without wishing to be held to any theory, the above formulations are believed to form acrylic urethane block/graft copolymers. In order to create such block/graft copolymers, hydroxyl-containing acrylic polymers were used. These acrylic polymers react with isocyanate to incorporate themselves into the polyurethane prepolymers. These reactive hot melts have excellent performance; the copolymers showed excellent green strength, long processing time and good melt stability, even upon exposure to moisture.

What is claimed is:

1. A solvent-free moisture-curing polyurethane hot melt adhesive composition, wherein said hot melt adhesive composition is solid at room temperature, comprising one or more products obtained by combining;

a) at least one low molecular weight polymer consisting essentially of ethylenically unsaturated monomers selected from the group consisting of $C_1$ to $C_{18}$-alkylesters of acrylic acid, $C_1$ to $C_{18}$-alkylesters of methacrylic acid, $C_1$ to $C_{18}$-alkylesters of crotonic acid, $C_1$ to $C_{18}$-alkylesters of maleic acid, $C_1$ to $C_{18}$-alkylesters of fumaric acid, $C_1$ to $C_{18}$-alkylesters of itaconic acid, hydroxyfunctional (meth)acrylates, hydroxyalkyl esters of unsaturated carboxylic acids, styrene, butadiene, acrylic acid, methacrylic acid, esters of (meth)acrylic acid and glycol oligomers and polymers, esters of (meth)acrylic acid and glycol ethers, vinyl esters, vinylethers, fumarates, maleates, alkyl styrenes, acrylonitrile, and mixtures thereof, wherein at least one of the ethylenically unsaturated monomers is selected from the group consisting of $C_1$ to $C_{18}$-alkylesters of acrylic acid, $C_1$ to $C_{18}$-alkylesters of methacrylic acid, acrylic acid, methacrylic acid, hydroxyethyl acrylate, hydroxyethyl methacrylate, hydroxypropyl acrylate and hydroxypropyl methacrylate, and wherein said polymer has active hydrogen groups and a hydroxyl number of no more than 4 mg KOH/g as determined according to DIN 53783;

b) at least one polyol selected from the group consisting of polyether diols, polyether triols, polyester polyols, aromatic polyols and mixtures thereof; and c) at least one polyisocyanate.

2. The hot melt adhesive composition of claim 1 wherein at least one polyol is a polyether diol selected from the group consisting of polyethyleneoxide-diols, polypropyleneoxide-diols, diol copolymers of ethylene oxide and propylene oxide, diols of butylene oxide, and mixtures thereof.

3. The hot melt adhesive composition of claim 1, wherein at least one polyol is a polyester polyol which is an OH-terminated condensation product of at least one $C_2$–$C_{18}$ dicarboxylic acid and at least one diol selected from $C_2$–$C_{16}$ alkylene diols, diethylene glycol, triethylene glycol, tetraethylene glycol, dipropylene glycol, tripropylene glycol, tetrapropylene glycol and mixtures thereof.

4. The hot melt adhesive composition according to claim 3 wherein the OH-terminated condensation product further comprises at least one triol selected from the group consisting of glycerol, trimethylolpropane, triethylolpropane and mixtures thereof.

5. The hot melt adhesive composition of claim 1, wherein at least one polyol is a polyester polyol made from ε-caprolactone.

6. The hot melt adhesive composition of claim 1, wherein at least one polyisocyanate is selected from the group consisting of toluenediisocyanate, naphthalene-1,5-diisocyanate, naphthalene-1,4-diisocyanate, 4,4'-diphenylmethane-diisocyanate, 2,4'-diphenylmethane-diisocyanate, xylylenediisocyanate, 2,2-diphenylpropane-4,4'-diisocyanate, p-phenylene diisocyanate, m-phenylene diisocyanate, diphenyl-4,4'-diisocyanate, diphenylsulphone-4,4'-diisocyanate, furfurylidene diisocyanate, 1-chlorobenzene-2,4-diisocyanate, 4,4',4"-triisocyanato-triphenyl-methane, 1,3,5-triisocyanato-benzene, 2,4,6-triisocyanato-toluene, 4,4'-dicyclohexylmethane diisocyanate, 3,5,5-trimethyl-3-isocyanatomethyl-1-isocyanato-cyclohexane, cyclohexane-1,4-diisocyanate, cyclohexane-1,2-diisocyanate, hydrogenated xylylene diisocyanate, m- or p-tetramethylxylylene diisocyanate, diisocyanate from dimeracid, hexane-1,6-diisocyanate, 2,2,4-trimethylhexane-1,6-diisocyanate, 2,4,4-trimethylhexane-1,6-diisocyanate, butane-1,4-diisocyanate, 1,12-dodecane diisocyanate and mixtures thereof.

7. The hot melt adhesive composition of claim 1, wherein the low molecular weight polymer has a hydroxyl number of at least about 0.5 mg KOH/g as determined according to DIN 53783.

8. The hot melt adhesive composition according to claim 1, wherein the low molecular weight polymer has a hydroxyl number of at least about 1 mg KOH/g as determined according to DIN 53783.

9. The hot melt adhesive composition according to claim 1, wherein the low molecular weight polymer has a weight average molecular weight between about 10,000 and 90,000, as determined by gel permeation chromatography.

10. The hot melt adhesive composition according to claim 1, wherein the weight average molecular weight of the low molecular weight polymer is between about 20,000 and about 80,000 as determined by gel permeation chromatography.

11. The hot melt adhesive composition of claim 1, wherein said composition is essentially free of tin catalysts.

12. The hot melt adhesive composition of claim 1, wherein said polyisocyanate is a liquid mixture of 4,4'-diphenylmethane-diisocyanate and 2,4'-diphenylmethane-diisocyanate.

13. The hot melt adhesive composition of claim 1 wherein the active hydrogen groups in the polymer are predominantly terminal.

14. The hot melt adhesive composition of claim 1 wherein the active hydrogen groups have been incorporated into the polymer using a free radical starter having active hydrogen groups.

15. The hot melt adhesive composition of claim 1 wherein the active hydrogen groups have been incorporated into the polymer using a chain transfer agent bearing active hydrogen groups.

16. The hot melt adhesive composition of claim 1 wherein the active hydrogen groups have been incorporated into the polymer using both a free radical starter having active hydrogen groups and a chain transfer agent bearing active hydrogen groups.

17. The hot melt adhesive composition according to claim 1, wherein said hot melt adhesive composition is prepared by a process comprising
(a) reacting the at least one low molecular weight polymer with a first polyisocyanate to form a first prepolymer;
(b) separately from (a), reacting the polyol with a second polyisocyanate, which may be the same as or different from the first polyisocyanate, to form a polyurethane prepolymer with free isocyanate groups; and
(c) mixing the first prepolymer and the polyurethane prepolymer.

18. The hot melt adhesive composition according to claim 17, wherein said process comprises the additional step of blending in at least one additive selected from the group consisting of catalysts, tackifiers, plasticizers, fillers, pigments, stabilizers, adhesion promoters, flame retardants, conductive agents, rheology improvers, and mixtures thereof.

19. The hot melt adhesive composition according to claim 17 comprising about 95 to about 3% by weight of the first prepolymer and about 5 to about 90% by weight of the polyurethane prepolymer.

20. The hot melt adhesive according to claim 17 wherein the at least one low molecular weight polymer is dissolved in a low boiling inert solvent prior to step (a) and wherein said low boiling inert solvent is subsequently flashed off.

21. The hot melt adhesive composition according to claim 17 wherein the at least one low molecular weight polymer is reacted with a stoichiometric excess of the first polyisocyanate in a mixer or extruder with sufficient residence time to allow complete reaction of the active hydrogen groups of the polymer with the first polyisocyanate.

22. The hot melt adhesive composition according to claim 1, wherein said hot melt adhesive composition is prepared by a process comprising
(a) homogenizing the at least one low molecular weight polymer and the at least one polyol to form a blend; and
(b) reacting the blend with the at least one polyisocyanate.

23. The hot melt adhesive according to claim 22, wherein said process comprises an additional step of blending in at least one additive selected from the group consisting of catalysts, tackifiers, plasticizers, fillers, pigments, stabilizers, adhesion promoters, flame retardants, conductive agents, rheology improvers, and mixtures thereof.

24. The hot melt adhesive composition according to claim 22 wherein step (b) is performed in an extruder or mixer capable of homogenizing high viscosity components under the exclusion of moisture.

25. The hot melt adhesive composition according to claim 1, wherein said hot melt adhesive composition is prepared by a process comprising
(a) mixing the at least one polymer with a first portion of the at least one polyol to form a mixture having a viscosity not in excess of 80,000 mPas at 130° C.;
(b) reacting said mixture with the at least one polyisocyanate; and
(c) adding a second portion of the at least one polyol.

26. The hot melt adhesive composition according to claim 25, wherein said process comprises an additional step of blending in at least one additive selected from the group consisting of catalysts, tackifiers, plasticizers, fillers, pigments, stabilizers, adhesion promoters, flame retardants, conductive agents, rheology improvers and mixtures thereof.

27. The hot melt adhesive composition according to claim 25 wherein said process is carried out in the absence of any solvent.

28. The hot melt adhesive composition according to claim 1, wherein said composition additionally comprises at least one additive selected from the group consisting of catalysts, tackifiers, plasticizers, fillers, pigments, stabilizers, adhesion promoters, flame retardants, conductive agents, rheology improvers and mixtures thereof.

29. A solvent-free moisture curing polyurethane hot melt adhesive composition, wherein said hot melt adhesive composition is solid at room temperature, comprising one or more products obtained by combining:
a) at least one polymer having i) a weight average molecular weight as determined by gel permeation chromatography of between about 10,000 and about 90,000, and ii) a hydroxyl number of from 1 to 4 mg KOH/g and consisting essentially of ethylenically unsaturated monomers selected from the group consisting of $C_1$ to $C_{18}$-alkylesters of acrylic acid, $C_1$ to $C_{18}$-alkylesters of methacrylic acid, acrylic acid, methacrylic acid, hydroxyethyl acrylate, hydroxyethyl methacrylate, hydroxypropyl acrylate, hydroxypropyl methacrylate and mixtures thereof wherein at least a portion of the ethylenically unsaturated monomers bear active hydrogen groups;

b) at least one polyol selected from the group consisting of polyether diols, polyether triols, polyester polyols, and mixtures thereof; and c) at least one aromatic polyisocyanate.

30. The hot melt adhesive composition of claim 29, wherein at least one aromatic polyisocyanate is a diphenyl methane diisocyanate.

31. The hot melt adhesive composition of claim 29, wherein at least one polyol is a polyether diol derived from propylene oxide and, optionally, one or more other $C_2$–$C_4$ epoxides and at least one polyol is a poly(ester) diol having a glass transition temperature of from about −40° C. to +40° C., a viscosity of about 3,000 to 30,000 mPa.s at 130° C., and a hydroxyl number of about 2 to about 40 mg KOH/g.

32. The hot melt adhesive composition of claim 29 wherein the polymer has a weight average molecular weight in the range between about 20,000 and about 80,000.

33. The hot melt adhesive composition of claim 29, wherein the polymer has active hydrogen groups statistically distributed thereon.

34. The hot melt adhesive composition according to claim 29 further comprising at least one additive selected from the group consisting of tackifiers, plasticizers, fillers, pigments, stabilizers, adhesion promoters, flame retardants, conductive agents, rheology improvers, and mixtures thereof.

35. An improved process for joining substrates with a hot melt adhesive wherein the improvement comprises joining said substrates with the hot melt adhesive composition of claim 29.

36. Joined substrates, produced by the process of claim 35.

37. A solvent-free moisture-curing polyurethane hot melt adhesive composition, wherein solid hot melt adhesive composition is solid at room temperature, comprising a) at least one polymer having i) a weight average molecular weight as determined by gel permeation chromatography of between about 20,000 and about 80,000 and ii) a hydroxyl number of from 1 to 4 mg KOH/g and consisting essentially of ethylenically unsaturated monomers selected from the group consisting of methyl methacrylate, butyl methacrylate, acrylic acid, methacrylic acid, hydroxyethyl acrylate, hydroxyethylmethacrylate, hydroxypropyl acrylate, hydroxypropylmethacrylate and mixtures thereof;

b) a polyol mixture comprised of a polypropylene oxide-diol and a poly(hexane adipate) diol and c) at least one diphenylmethane diisocyanate.

38. The hot melt adhesive composition of claim 37 further comprising at least one additive selected from the group consisting of tackifiers, plasticizers, fillers, pigments, stabilizers, adhesion promoters, flame retardants, conductive agents, rheology improvers, and mixtures thereof.

39. The hot melt adhesive composition of claim 37 wherein said polymer is from about 20 wt % to about 28 wt % of the hot melt adhesive composition.

40. An improved process for joining substrates with a hot melt adhesive comprising a step of applying the hot melt adhesive to a substrate using an open roll coater while exposing the hot melt adhesive to atmospheric moisture and elevated temperatures, wherein the improvement comprises joining said substrates with the hot melt adhesive composition of claim 37 as the hot melt adhesive.

41. Joined substrates, produced by the process of claim 40.

42. A solvent-free moisture-curing polyurethane hot melt adhesive composition, wherein said hot melt adhesive composition is solid at room temperature, comprising one or more products obtained by combining:

a) at least one low molecular weight polymer consisting essentially of ethylenically unsaturated monomers selected from the group consisting of $C_1$ to $C_{18}$-alkylesters of acrylic acid, $C_1$ to $C_{18}$-alkylesters of methacrylic acid, $C_1$ to $C_{18}$-alkylesters of crotonic acid, $C_1$ to $C_{18}$-alkylesters of maleic acid, $C_1$ to $C_{18}$-alkylesters of fumaric acid, $C_1$ to $C_{18}$-alkylesters of itaconic acid, styrene, butadiene, acrylic acid, methacrylic acid, esters of (meth)acrylic acid and glycol ethers, vinyl esters, vinylethers, fumarates, maleates, alkyl styrenes, acrylonitrile, and mixtures thereof, wherein at least one of the ethylenically unsaturated monomers is selected from the group consisting of $C_1$ to $C_{18}$-alkylesters of acrylic acid, $C_1$ to $C_{18}$-alkylesters of methacrylic acid, acrylic acid, and methacrylic acid, and wherein said polymer has active hydrogen groups, which are predominately terminal;

b) at least one polyol selected from the group consisting of polyether diols, polyether triols, polyester polyols, aromatic polyols and mixtures thereof; and c) at least one polyisocyanate.

43. The hot melt adhesive composition of claim 42 wherein at least one polyol is a polyether diol selected from the group consisting of polyethyleneoxide-diols, polypropyleneoxide-diols, diol copolymers of ethylene oxide and propylene oxide, diols of butylene oxide, and mixtures thereof.

44. The hot melt adhesive composition of claim 42, wherein at least one polyol is a polyester polyol which is an OH-terminated condensation product of at least one $C_2$–$C_{18}$ dicarboxylic acid and at least one diol selected from $C_2$–$C_{16}$ alkylene diols, diethylene glycol, triethylene glycol, tetraethylene glycol, dipropylene glycol, tripropylene glycol, tetrapropylene glycol and mixtures thereof.

45. The hot melt adhesive composition according to claim 44 wherein the OH-terminated condensation product further comprises at least one triol selected from the group consisting of glycerol, trimethylolpropane, triethylolpropane and mixtures thereof.

46. The hot melt adhesive composition of claim 42, wherein at least one polyol is a polyester polyol made from ε-caprolactone.

47. The hot melt adhesive composition of claim 42, wherein at least one polyisocyanate is selected from the group consisting of toluenediisocyanate, naphthalene-1,5-diisocyanate, naphthalene-1,4-diisocyanate, 4,4'-diphenylmethane-diisocyanate, 2,4'-diphenylmethane-diisocyanate, xylylenediisocyanate, 2,2-diphenylpropane-4,4'-diisocyanate, p-phenylene diisocyanate, m-phenylene diisocyanate, diphenyl-4,4'-diisocyanate, diphenylsulphone-4,4'-diisocyanate, furfurylidene diisocyanate, 1-chlorobenzene-2,4-diisocyanate, 4,4',4"-triisocyanato-triphenyl-methane, 1,3,5-triisocyanato-benzene, 2,4,6-triisocyanato-toluene, 4,4'-dicyclohexylmethane diisocyanate, 3,5,5-trimethyl-3-isocyanatomethyl-1-isocyanato-cyclohexane, cyclohexane-1,4-diisocyanate, cyclohexane-1,2-diisocyanate, hydrogenated xylylene diisocyanate, m- or p-tetramethylxylylene diisocyanate, diisocyanate from dimeracid, hexane-1,6-diisocyanate, 2,2,4-trimethylhexane-1,6-diisocyanate, 2,4,4-trimethylhexane-1,6-diisocyanate, butane-1,4-diisocyanate, 1,12-dodecane diisocyanate and mixtures thereof.

48. The hot melt adhesive composition of claim 42, wherein the low molecular weight polymer has a hydroxyl number of at least about 0.5 mg KOH/g as determined according to DIN 53783.

49. The hot melt adhesive composition according to claim 42, wherein the low molecular weight polymer has a hydroxyl number of no greater than about 20 mg KOH/g as determined according to DIN 53783.

50. The hot melt adhesive composition according to claim 42, wherein the low molecular weight polymer has a weight average molecular weight between about 10,000 and 90,000, as determined by gel permeation chromatography.

51. The hot melt adhesive composition according to claim 42, wherein the weight average molecular weight of the low molecular weight polymer is between about 20,000 and about 80,000 as determined by gel permeation chromatography.

52. The hot melt adhesive composition of claim 42, wherein said composition is essentally free of tin catalysts.

53. The hot melt adhesive composition of claim 42, wherein said polyisocyanate is a liquid mixture of 4,4'-diphenylmethane-diisocyanate and 2,4'-diphenylmethane-diisocyanate.

54. The hot melt adhesive composition according to claim 42, wherein said hot melt adhesive composition is prepared by a process comprising
  a) reacting the at least one low molecular weight polymer with a first polyisocyanate to form a first prepolymer;
  (b) separately from (a), reacting the polyol with a second polyisocyanate, which may be the same as or different from the first polyisocyanate, to form a polyurethane prepolymer with free isocyanate groups; and
  (c) mixing the first prepolymer and the polyurethane prepolymer.

55. The hot melt adhesive composition according to claim 54, wherein said process comprises the additional step of blending in at least one additive selected from the group consisting of catalysts, tackifiers, plasticizers, fillers, pigments, stabilizers, adhesion promoters, flame retardants, conductive agents, rheology improvers, and mixtures thereof.

56. The hot melt adhesive composition according to claim 54 comprising about 95 to about 8% by weight of the first prepolymer and about 5 to about 90% by weight of the polyurethane prepolymer.

57. The hot melt adhesive according to claim 54 wherein the at least one low molecular weight polymer is dissolved in a low boiling inert solvent prior to step (a) and wherein said low boiling inert solvent is subsequently flashed off.

58. The hot melt adhesive composition according to claim 54 wherein the at least one low molecular weight polymer is reacted with a stoichiometric excess of the first polyisocyanate in a mixer or extruder with sufficient residence time to allow complete reaction of the active hydrogen groups of the polymer with the first polyisocyanate.

59. The hot melt adhesive composition according to claim 42, wherein said hot melt adhesive composition is prepared by a process comprising
  (a) homogenizing the at least one low molecular weight polymer and the at least one polyol to form a blend; and
  (b) reacting the blend with the at least one polyisocyanate.

60. The hot melt adhesive according to claim 59, wherein said process comprises an additional step of blending in at least one additive selected from the group consisting of catalysts, tackifiers, plasticizers, fillers, pigments, stabilizers, adhesion promoters, flame retardants, conductive agents, rheology improvers, and mixtures thereof.

61. The hot melt adhesive composition according to claim 59 wherein step (b) is performed in an extruder or mixer capable of homogenizing high viscosity components under the exclusion of moisture.

62. The hot melt adhesive composition according to claim 42, wherein said hot melt adhesive composition is prepared by a process comprising
  a) mixing the at least one polymer with a first portion of the at least one polyol o form a mixture having a viscosity not in excess of 80,000 mPas at 130° C.;
  b) reacting said mixture with the at least one polyisocyanate; and
  c) adding a second portion of the at least one polyol.

63. The hot melt adhesive composition according to claim 62, wherein said process comprises an additional step of blending in at least one additive selected from the group consisting of catalysts, tackifiers, plasticizers, fillers, pigments, stabilizers, adhesion promoters, flame retardants, conductive agents, rheology improvers and mixtures thereof.

64. The hot melt adhesive composition according to claim 62, wherein said process is carried out in the absence of any solvent.

65. The hot melt adhesive composition according to claim 42, wherein said composition additionally comprises at least one additive selected from the group consisting of catalysts, tackifiers, plasticizers, fillers, pigments stabilizers, adhesion promoters flame retardants, conductive agents, rheology improvers and mixtures thereof.

66. A solvent-free moisture curing polyurethane hot melt adhesive composition, wherein said hot melt adhesive composition is solid at room temperature, comprising one or more products obtained by combining:
  a) at least one polymer consisting essentially of ethylenically unsaturated monomers selected from the group consisting of $C_1$ to $C_{18}$-alkylesters of acrylic acid, $C_1$ to $C_{18}$-alkylesters of methacrylic acid, acrylic acid, methacrylic acid, and mixtures thereof and having i) a weight average molecular weight as determined by gel permeation chromatography of between about 10,000 and about 90,000; ii) a hydroxyl number of from 0.5 to 20 mg KOH/g; and (iii) predominately terminal active hydrogen groups,
  b) at least one polymer selected from the group consisting of polyether diols, polyether triols, polyester polyols, and mixtures thereof; and
  c) at least one aromatic polyisocyanate.

* * * * *

UNITED STATES PATENT AND TRADEMARK OFFICE
CERTIFICATE OF CORRECTION

PATENT NO. : 6,465,104 B1
DATED : October 15, 2002
INVENTOR(S) : Krebs et al.

It is certified that error appears in the above-identified patent and that said Letters Patent is hereby corrected as shown below:

Column 21,
Line 40, delete "8%", and insert therefor -- 3% --.

Column 22,
Line 16, after "polyol", delete "o", and insert therefor -- to --.

Signed and Sealed this

First Day of July, 2003

JAMES E. ROGAN
*Director of the United States Patent and Trademark Office*